Oct. 31, 1961     E. R. KREINBERG     3,007,113
SYSTEM FOR TESTING SEMICONDUCTOR DEVICES
Filed May 4, 1959     2 Sheets-Sheet 1

INVENTOR.
EARL R. KREINBERG
BY
Fordyce A. Bothwell
ATTORNEY

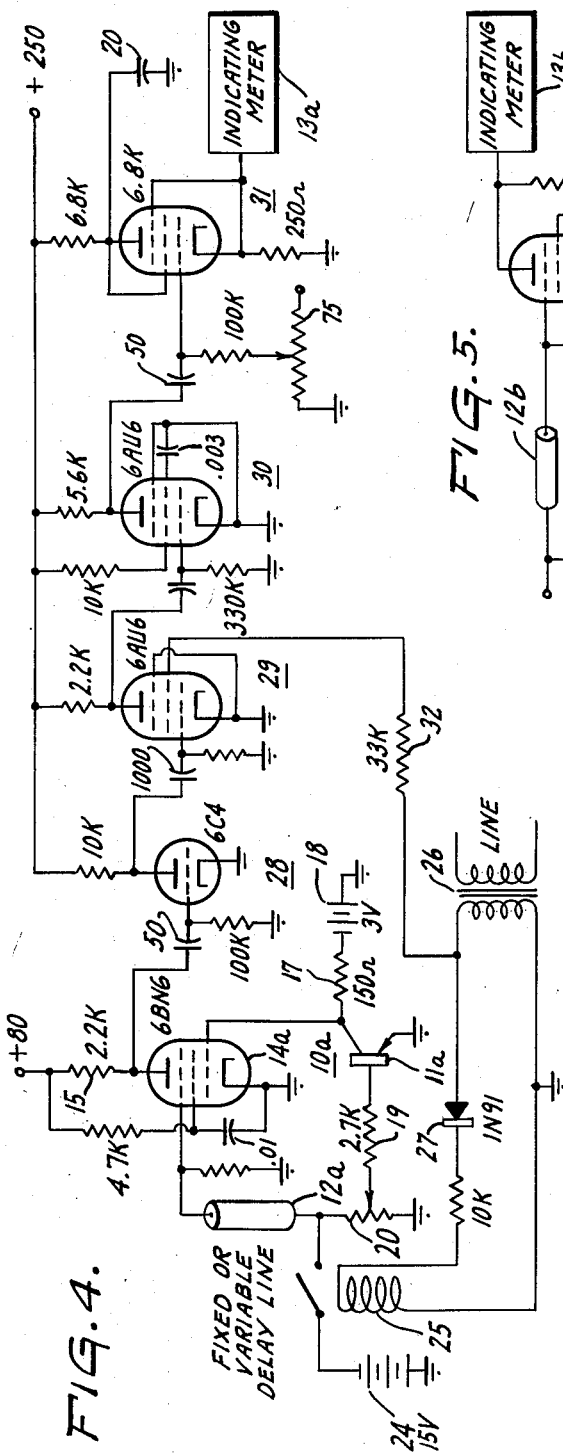
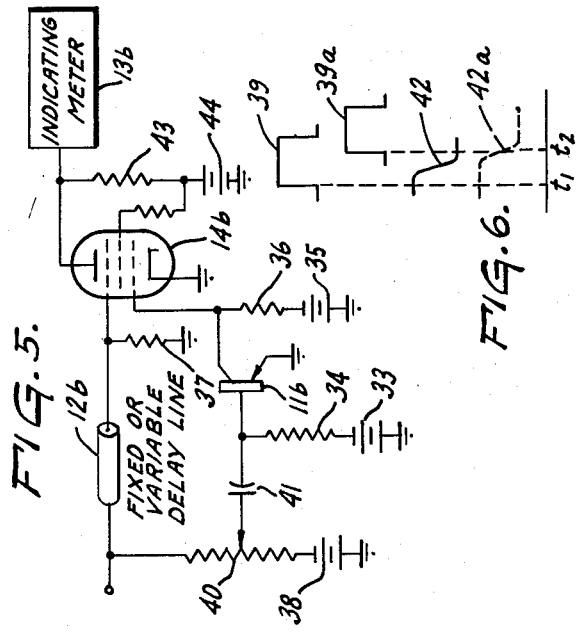
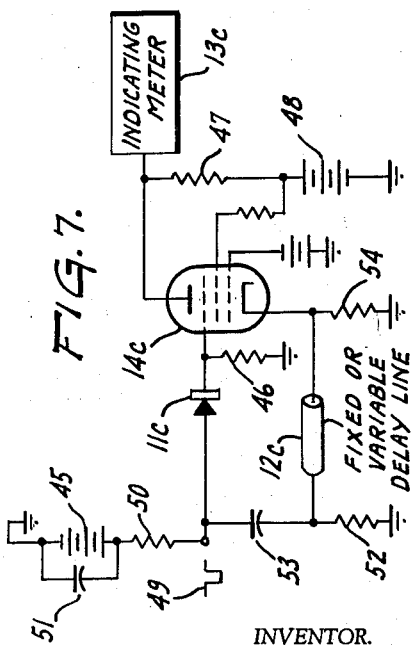
INVENTOR.
EARL R. KREINBERG

United States Patent Office 3,007,113
Patented Oct. 31, 1961

3,007,113
SYSTEM FOR TESTING SEMICONDUCTOR
DEVICES
Earl R. Kreinberg, Graterford, Pa., assignor to Philco
Corporation, Philadelphia, Pa., a corporation of Pennsylvania
Filed May 4, 1959, Ser. No. 810,700
15 Claims. (Cl. 324—158)

This invention relates to the testing of semiconductor devices, and more particularly to the testing thereof to determine the rapidity with which each such device proceeds from one condition to another.

In certain instances the rapidity with which a semiconductor device proceeds from one condition to another is a very important factor. For example, in the case of transistors designed for high speed on-off switching operation, the rapidity of turn-on or turn-off of a transistor is very important as it determines whether the transistor is suited for the particular application for which it is intended. Another example is the rapidity of reverse recovery of semiconductor diodes.

The determination of rapidity of such high-speed operations has presented a problem. By way of demonstration, the turn-on time of a switching transistor may be of the order of 18 milli-microseconds, i.e. 18 billionths of a second. Not only is it necessary to effect repetition of this high-speed operation at a repetition rate above the threshold of persistence of human vision but it is also necessary to present visual representation, at such repetition rate, of the rapidity of the high-speed operation. While the standard oscilloscope is useful generally for visual representation of fast changing current or voltage, it is not sufficiently fast acting to follow high-speed operations such as those above mentioned. For this reason the travelling wave type oscilloscope has been employed in a rather elaborate system, but this has not been entirely satisfactory because the system is too expensive and the oscilloscope is difficult to read.

The principal object of the present invention is to provide a satisfactory solution of this problem; that is to provide a satisfactory system for determining the rapidity of operations such as those mentioned above.

Another object of the invention is to provide such a system wherein it is possible to employ a simple meter, such as a peak reading coltmeter, instead of an oscilloscope.

In accordance with this invention, a system is provided wherein a controllable device, such as an electron tube, is subjected to dual control by the semiconductor device under test and by time control means in such manner that the desired determination is readily accomplished. The system is operated cyclically at a rate within the persistence of human vision, and a simple meter is employed for visual indication at said rate.

As hereinafter described, the controllable device may be a vacuum tube which is controllable through one of its electrodes by the semiconductor device in response to a pulse supplied to the latter; and said tube is controlled additionally by a delayed pulse supplied to another of its electrodes. The two pulses may be supplied by the same source, and a delay line may be employed to produce the delay of the second pulse with respect to the first pulse.

The invention may be fully understood from the following detailed description with reference to the accompanying drawings wherein FIG. 1 is a block diagram of a simple system according to this invention;

FIG. 4 is a diagrammatic illustration of the system of FIG. 2 as it has been used in practice;

FIG. 5 is a diagrammatic illustration of an embodiment for determining the rapidity of turn-off of a switching transistor;

FIG. 6 illustrates the operation of the system of FIG. 5; and

FIG. 7 is a diagrammatic illustration of an embodiment for determining the rapidity of reverse recovery of a semiconductor diode.

Figure 1:
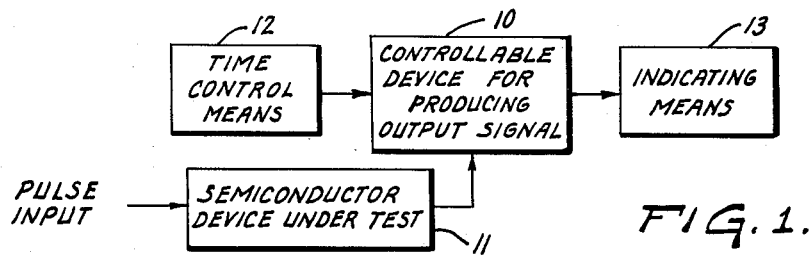

Referring first to FIG. 1, a system according to this invention comprises essentially a controllable device represented by block 10, which is controllable by the semiconductor device under test represented by block 11 for producing an output signal, time-control means represented by block 12 for controlling the device 10, and indicating means represented by block 13 to enable observation of the output signal. In operation of such a system as hereinafter described, the system is caused to operate cyclically at a rate (e.g. 60 cycles per second) which is relatively slow in comparison to the extremely rapid rate of the parameter being determined but which is well above the threshold of persistence of human vision. Consequently, the indicating means 13 repetitively indicates the signal produced by device 10 at a rate such that the indication appears to be continuous.

Figure 2:
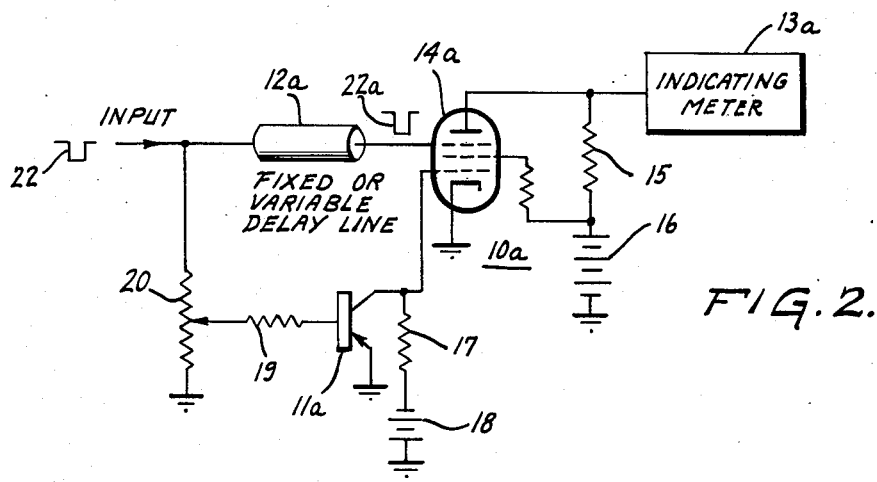
FIG. 2 is a diagrammatic illustration of one embodiment of the system for determining the rapidity of turn-on of a switching transistor.

Referring now to FIG. 2, there is shown an embodiment of the basic system for determination of the rapidity of turn-on of a switching transistor. The controllable device 10a comprises a vacuum tube stage including a multi-grid tube 14a whose cathode is connected to ground and whose plate or anode is connected through plate resistor 15 to a source 16 of positive plate supply voltage. The transistor 11a to be tested, which in this case is of the P-N-P type, has its emitter connected to ground and its collector connected through resistor 17 to a source 18 of negative collector supply voltage. The collector is also connected to the first grid of tube 14a. The base of the transistor is connected through the base current limiting resistor 19 to the movable tap of a potentiometer 20 which is connected across the input. The time control means 12a comprises a delay line which is connected between the input and the third grid of tube 14a.

In the absence of an input pulse, transistor 11a is turned off. The negative voltage of the collector supply source 18 is applied to the first grid of tube 14a so that the tube is biased to cut-off. When a negative pulse, such as shown at 22, is supplied to the input the following operation takes place: Transistor 11a starts to conduct and the voltage at its collector starts to rise and raises the potential of the first grid of tube 14a above cut-off so that the tube starts to conduct. As the collector current of the transistor rises, so also does the plate current of tube 14a. Consequently the voltage at the plate of tube 14a increases (in the negative direction) according to the rapidity with which transistor 11a turns on. In the meantime the delay line 12a has received the negative input pulse and after a time interval it applies a delayed negative pulse to the third grid of tube 14a turning it off.

Of course the polarity of the increasing output voltage may be made positive, if desired, simply by employing an amplifier stage between stage 10a and the meter 13a.

One way of operating the system is with a fixed delay line so that tube 14a is cut-off after a predetermined fixed time interval. Then the amplitude of the output signal at the instant of cut-off, i.e. the peak amplitude of the signal, represents the rapidity of turn-on of the transistor. Thus the operator simply reads the peak amplitude on meter 13a which may be a peak reading voltmeter.

Figure 3:
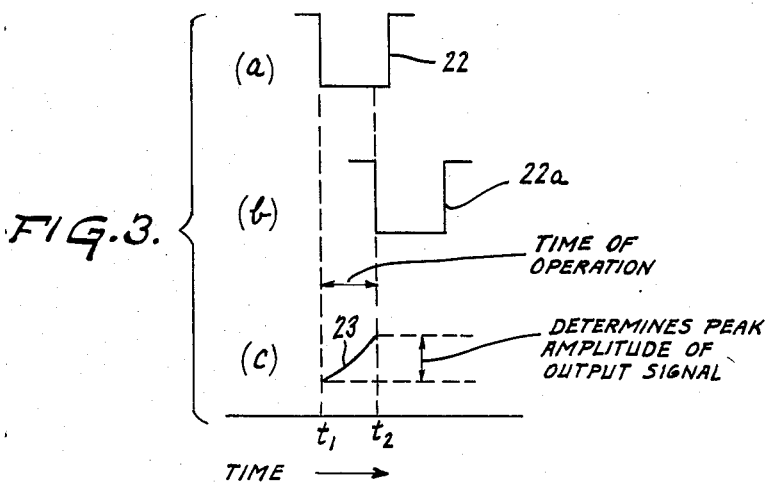
FIG. 3 illustrates the operation of the system of FIG. 2.

FIG. 3 depicts the operation and shows how the rapidity of turn-on of the transistor determines the peak amplitude of the output signal. At time $t_1$ the leading edge of the input pulse 22 initiates turn-on of transistor 11 and consequent operation of tube 14a. At time $t_2$ the delayed pulse 22a terminates the operation of tube 14a. During the time interval $t_1$–$t_2$ the voltage at the collector of transistor 11, shown at 23, rises at a rate determined by the rapidity of turn-on of the particular transistor. The amplitude of this voltage at time $t_2$ determines the peak amplitude of the output signal for it determines the amplitude at that instant of the plate current of tube 14a.

Assuming that a fixed delay line is employed, so that the time interval $t_1$–$t_2$ is a predetermined fixed time interval, the rapidity of turn-on of the test transistor is indicated by the amplitude of the output voltage as indicated by the meter 13a which may be calibrated in terms of the turn-on time of the transistor.

Another way of operating the system is with a variable delay line, in which case the operator varies the delay until the output signal has a predetermined peak amplitude. Then the adjustment of the delay line indicates the rapidity of turn-on of the transistor. In such case the variable delay line could be calibrated in terms of the turn-on time of the transistor.

Of course it will be understood that in any case pulses are supplied to the input at a repetition rate above the threshold of persistence of human vision.

Referring now to FIG. 4, there is shown a multi-stage system embodying this invention as it has been employed in actual practice for determination of turn-on time of transistors. The elements corresponding to those of FIG. 2 are similarly designated. Negative pulses are supplied to the system from a source 24 of continuous negative voltage through operation of a relay 25, which is preferably a mercury relay, energized from a transformer 26 through a diode rectifier 27. The primary of transformer 26 is connected to a 60 cycle power line.

The operation of vacuum tube stage 10a in response to each pulse is the same as described above in connection with FIG. 2. The output signal from stage 10a is supplied through stages 28 to 31 to the meter 13. Stages 28 and 30 are conventional amplifier stages, and stage 31 is a cathode follower output stage. Stage 29 serves as a gate to prevent passage therethrough of unwanted signals. The tube of this stage has its second grid connected through a resistor 32 to the connection between the secondary of transformer 26 and the diode rectifier 27. The tube is gated on and off by the A.C. voltage thus supplied to its second grid, said voltage being phased so that the tube is gated on to pass the desired signal from stage 10 but is gated off to reject unwanted signals.

As in the case of the simple system of FIG. 2, the system of FIG. 4 may be operated in either of two ways as previously described. Assuming that a fixed delay line is employed, in testing each transistor the operator simply observes the peak amplitude of the output signal as indicated by the meter 13 which may be calibrated in terms of turn-on time of the transistor.

Referring now to FIG. 5, there is shown a simple embodiment of the invention generally similar to FIG. 2 but adapted for determination of turn-off time of a switching transistor. In this embodiment the test transistor 11b is normally biased on by biasing battery 33 which is connected to the base through current limiting resistor 34. The collector of the transistor is connected to the first grid of tube 14b and also to battery 35 through resistor 36. The latter elements may be such that normally the potential at the first grid of tube 14b is approximately zero.

The third grid of tube 14b is connected to the upper end of resistor 37 which is included in a circuit including battery 38, potentiometer 40 and the delay line 12b. Through the voltage dividing action of resistors 37 and 40, a predetermined negative biasing potential is normally applied to the third grid of tube 14b and renders the tube non-conductive.

In operation a positive pulse is applied to the base of the transistor through potentiometer 40 and capacitor 41. This pulse is of sufficient magnitude to cause turn-off of the transistor. A relayed positive pulse is supplied to the third grid of tube 14b through the delay line. Whether or not the delayed pulse turns the tube on depends upon whether the turn-off time of the transistor is greater or less than the delay of the delay line. This is due to the fact that when the transistor is completely turned off the negative potential on the first grid of the tube renders the tube non-conductive.

Suppose, for example, that it is desired to determine whether the turn-off time of a transistor is less than a certain specified time. The delay line may be fixed or adjusted to give a delay equal to the specified time. Then in testing the transistor if the tube does not turn on and no signal indication appears on the meter, this means that the turn-off time of the transistor is less than the specified time; but if the tube turns on and a signal indication appears on the meter, this means that the turn-off time of the transistor is greater than the specified time.

This may be understood more clearly with the aid of FIG. 6. At time $t_1$ the input pulse 39 initiates turn-off of the transistor, and at time $t_2$ the delayed pulse 39a is applied to the third grid of the tube, the time interval $t_1$–$t_2$ being established by the delay line. If the transistor turns off within this time interval, as represented by the collector voltage 42, the full negative voltage of battery 35 is applied to the first grid of the tube and prevents it from turning on. However if the transistor does not turn off within the time interval $t_1$–$t_2$, as represented by the collector voltage 42a, the tube will be turned on at time $t_2$.

Another way of testing a transistor with this circuit is to adjust the delay line for such a small delay that the tube turns on, and then adjust the delay line to increase the delay until the tube just stays off. By having the delay line calibrated in terms of turn-off time, the turn-off time of a test transistor can be ascertained directly from the adjustment of the delay line.

Still another way of using the circuit is to adjust the delay line so that the tube turns on, and observe the amplitude of the output signal on the meter.

Referring now to FIG. 7, there is shown an embodiment of the invention for determining reverse recovery time of a semiconductor diode. The test diode 11c is normally biased forwardly by source 45 so that predetermined current flows through the diode and resistor 46. The positive voltage across resistor 46 is applied to the third grid of tube 14c so that the latter is rendered conductive despite the negative bias on its first grid, its plate current flowing through load resistor 47 and source 48. The output voltage supplied to meter 13c is then of minimum amplitude.

A negative pulse 49 applied across resistor 50 and by-pass capacitor 51 overcomes the bias of source 45 and initiates non-conduction of the diode. The decreasing voltage across resistor 46 initiates turn-off of tube 14c, causing increase of the output voltage.

In the meantime the negative pulse was applied across resistor 52 through blocking capacitor 53. The delay line 12c causes the negative pulse to appear across resistor 54 after a time interval. This turns the tube 14c back on, and at that instant the output voltage is a maximum. The rate of reverse recovery of the diode determines the amplitude of the output voltage at the instant tube 14c is turned back on. Thus the output voltage at that instant is representative of the rate of reverse recovery of the diode. Here again the delay line may be fixed or variable.

While certain embodiments of the invention have been illustrated and described, it will be understood that the invention is not limited thereto but contemplates such modifications and further embodiments as may occur to those skilled in the art.

I claim:

1. In a system for determining the rapidity with which a semiconductor device proceeds from one condition to another, a controllable electron tube having an output circuit, indicating means coupled to said output circuit, means to effect control of said tube through one of its electrodes from said semiconductor device, means for supplying a pulse to said semiconductor device, and means for supplying a delayed pulse to another electrode of said tube.

2. In a system for determining the rapidity with which a semiconductor device proceeds from one condition to another, a controllable electron tube having an output circuit, indicating means coupled to said output circuit, means for controlling said tube so as to effect change of current in said output circuit according to the rapidity with which a semiconductor device under test proceeds from one condition to another, and means for controlling said tube so as to terminate said change of current after a time interval.

3. In a system for determining the rapidity with which a semiconductor device proceeds from one condition to another, a device controllable by said semiconductor device for producing an output signal whose amplitude at any instant is determined by the rapidity with which the semiconductor device proceeds as aforesaid, means for effecting change of operation of said signal-producing device after a time interval, and means for indicating the amplitude of said signal at the end of said time interval.

4. In a system for determining the rapidity with which a semiconductor device proceeds from one condition to another, a device controllable by said semiconductor device for producing an output signal whose amplitude at any instant is determined by the rapidity with which the semiconductor device proceeds as aforesaid, means for supplying a pulse to said semiconductor device to effect controlled operation of said signal-producing device, means for supplying a delayed pulse to said signal-producing device to effect change of its operation after a time interval, and means for indicating the amplitude of said signal at the end of said time interval.

5. A system according to claim 4, wherein said means for supplying a delayed pulse comprises a delay line connected between said first means and said signal-producing device.

6. In a system for determining the rapidity with which a semiconductor device proceeds from one condition to another, a vacuum tube controllable through one of its electrodes by said semiconductor device for producing an output signal whose amplitude at any instant is determined by the rapidity with which the semiconductor device proceeds as aforesaid, means for supplying a pulse to said semiconductor device to effect controlled operation of said vacuum tube stage, means for supplying a delayed pulse to another electrode of said tube to effect change of its operation after a time interval, and means for indicating the amplitude of said signal at the end of said time interval.

7. In a system for determining the rapidity with which a transistor proceeds between off and on conditions, a vacuum tube controllable through one of its electrodes by said transistor for producing an output signal whose amplitude at any instant is determined by the rapidity with which the transistor proceeds as aforesaid, means for supplying a pulse to said transistor to effect controlled operation of said vacuum tube stage, means for supplying a delayed pulse to another electrode of said tube to effect change of its operation after a time interval, and means for indicating the amplitude of said signal at the end of said time interval.

8. A system according to claim 7, wherein said means for supplying a delayed pulse comprises a delay line connected between said first means and said other electrode of said tube.

9. In a system for determining the rapidity with which a semiconductor device proceeds from one condition to another, a device controllable by said semiconductor device for producing an output signal whose amplitude at any instant is determined by the rapidity with which the semiconductor device proceeds as aforesaid, means for effecting change of operation of said signal-producing device after a predetermined fixed time interval, whereby at the instant of said change the amplitude of said signal is representative of the rapidity with which said semiconductor device proceeds as aforesaid, a signal-indicating meter, and means for supplying said signal to said meter to enable observation of the signal amplitude at the instant of said change.

10. In a system for determining the rapidity with which a semiconductor device proceeds from one condition to another, a device controllable by said semiconductor device for producing an output signal whose amplitude at any instant is determined by the rapidity with which the semiconductor device proceeds as aforesaid, means for supplying a pulse to said semiconductor device to effect controlled operation of said signal-producing device, means for supplying a delayed pulse to said signal-producing device to effect change of its operation after a predetermined fixed time interval, whereby at the instant of said change the amplitude of said signal is representative of the rapidity with which said semiconductor device proceeds as aforesaid, a signal-indicating meter, and means for supplying said signal to said meter to enable observation of the signal amplitude at the instant of said change.

11. A system according to claim 10, wherein said means for supplying a delayed pulse comprises a delay line connected between said first means and said signal-producing device.

12. In a system for determining the rapidity with which a semiconductor device proceeds from one condition to another, a vacuum tube controllable through one of its electrodes by said semiconductor device for producing an output signal whose amplitude at any instant is determined by the rapidity with which the semiconductor device proceeds as aforesaid, means for supplying a pulse to said semiconductor device to effect controlled operation of said vacuum tube stage, means for supplying a delayed pulse to another electrode of said tube to effect change of its operation after a predetermined fixed time interval, whereby at the instant of said change the amplitude of said signal is representative of the rapidity with which said semiconductor device proceeds as aforesaid, a signal-indicating meter, and means for supplying said signal to said meter to enable observation of the signal amplitude at the instant of said change.

13. A system according to claim 12, wherein said means for supplying a delayed pulse comprises a delay line connected between said first means and said other electrode of said tube.

14. In a system for determining the rapidity of reverse recovery of a semiconductor diode, a signal-producing stage including an electron tube having a control electrode, an indicating meter connected to the output of said stage to receive the signal produced thereby, a conduction circuit for said diode including a load impedance, means for applying a forward bias to said diode to effect current flow in said circuit and to produce a voltage across said impedance, means for applying said voltage to said control electrode to render said tube conductive, means for applying a reverse bias to said diode to initiate non-conduction of said diode and said tube, and means for rendering said tube conductive after a time interval.

15. In a system for determining the rapidity with which a transistor proceeds between on and off conditions, a controllable electron tube having an output circuit, indicating means coupled to said output circuit, means to effect control of said tube through one of its electrodes from said transistor means for supplying a pulse to said transistor to cause it to proceed from on to off condition, and means including a delay line for supplying a delayed pulse to another electrode of said tube.

References Cited in the file of this patent

UNITED STATES PATENTS

| 2,545,541 | Blair | Mar. 20, 1951 |
| 2,824,958 | Dunn | Feb. 25, 1958 |

OTHER REFERENCES

Simmons: "Semiconductor Products," May–June 1958, pp. 14–18.

Rosenheim: "IBM Technical Disclosure Bulletin," vol. 1, No. 1, June 1958, pp. 24–25.

Dickey: "Electronic Design," February 4, 1959, pp. 18–21.